(12) United States Patent
Keranen et al.

(10) Patent No.: US 11,754,157 B2
(45) Date of Patent: Sep. 12, 2023

(54) INTEGRATED MOTOR LINEAR ACTUATOR

(71) Applicant: Tolomatic, Inc., Hamel, MN (US)

(72) Inventors: Lucas Keranen, Orono, MN (US); Wyatt Grunerud, Minnetonka, MN (US); Gary Rosengren, Brooklyn Park, MN (US)

(73) Assignee: Tolomatic, Inc., Hamel, MN (US)

( * ) Notice: Subject to any disclaimer, the term of this patent is extended or adjusted under 35 U.S.C. 154(b) by 0 days.

(21) Appl. No.: 16/878,897

(22) Filed: May 20, 2020

(65) Prior Publication Data

US 2021/0364070 A1 Nov. 25, 2021

(51) Int. Cl.
| | | |
|---|---|---|
| *F16H 25/22* | (2006.01) | |
| *F16H 25/20* | (2006.01) | |
| *F16H 25/24* | (2006.01) | |
| *F16H 57/04* | (2010.01) | |

(52) U.S. Cl.
CPC ..... *F16H 25/2247* (2013.01); *F16H 25/2015* (2013.01); *F16H 25/2454* (2013.01); *F16H 57/0497* (2013.01)

(58) Field of Classification Search
CPC ............. F16H 25/2252; F16H 25/2247; F16H 25/2454; F16H 57/0497; F16H 25/2015; F16H 2025/2031; F16H 2025/2078
See application file for complete search history.

(56) References Cited

U.S. PATENT DOCUMENTS

| | | |
|---|---|---|
| 4,510,565 A | 4/1985 | Dummermuth |
| 4,841,113 A | 6/1989 | Hamada et al. |
| 4,859,920 A | 8/1989 | Kurakake et al. |
| 4,878,002 A | 10/1989 | Heatzig et al. |
| 4,879,644 A | 11/1989 | Gottshall |
| 4,908,556 A | 3/1990 | Daggett et al. |

(Continued)

FOREIGN PATENT DOCUMENTS

| | | |
|---|---|---|
| CA | 2578889 A1 | 8/2007 |
| DE | 102010051061 A1 | 5/2011 |

(Continued)

OTHER PUBLICATIONS

International Search Report and Written Opinion dated Jul. 21, 2014 in connection with International Patent Application No. PCT/US2014/026168, 10 pages.

(Continued)

*Primary Examiner* — Gregory Robert Weber
(74) *Attorney, Agent, or Firm* — Dorsey & Whitney LLP

(57) ABSTRACT

A linear actuator system having an actuator housing, a motor assembly, a screw shaft, a thrust tube, and a nut assembly. The nut assembly is engaged with the screw shaft and directly coupled with the thrust tube. The nut assembly can define a mechanical fitting for direct physical engagement between the thrust tube and the nut assembly, absent additional load bearing components intervening therebetween. The nut assembly is configured to convert rotational motion of the rotor about the longitudinal axis to linear motion of the thrust tube along the longitudinal axis. A cooling loop can be at least partially embedded, potted or seated within the actuator housing, with a thermally conductive material disposed at least partially about the cooling loop to conduct heat from the actuator housing.

23 Claims, 10 Drawing Sheets

(56) References Cited

U.S. PATENT DOCUMENTS

| | | | |
|---|---|---|---|
| 4,962,338 A | 10/1990 | Daggett et al. | |
| 5,099,161 A | 3/1992 | Wolfbauer | |
| 5,241,250 A | 8/1993 | Nagasawa et al. | |
| 5,463,296 A | 10/1995 | Fugere et al. | |
| 5,557,154 A | 9/1996 | Erhart | |
| 5,931,047 A | 8/1999 | Ellqvist et al. | |
| RE36,631 E | 3/2000 | Tanabe et al. | |
| 6,067,868 A | 5/2000 | Nakamura et al. | |
| 6,072,145 A | 6/2000 | Suita et al. | |
| 6,124,693 A | 9/2000 | Okanda et al. | |
| 6,142,030 A * | 11/2000 | Nagai | B23Q 1/25 74/89.32 |
| 6,188,190 B1 | 2/2001 | Arakawa | |
| 6,469,272 B2 | 10/2002 | Dugas et al. | |
| 6,588,289 B2 | 7/2003 | Ung et al. | |
| 6,603,228 B1 | 8/2003 | Sato | |
| 6,828,522 B2 | 12/2004 | Hochhalter et al. | |
| 7,105,959 B2 * | 9/2006 | Yamamoto | H02K 5/20 310/52 |
| 7,541,707 B2 | 6/2009 | Hochhalter et al. | |
| 7,939,979 B2 * | 5/2011 | Hochhalter | H02K 11/21 310/80 |
| 8,701,834 B2 * | 4/2014 | Jacob | F16H 57/0471 184/6.12 |
| 8,904,890 B2 * | 12/2014 | Park | F15B 15/084 74/89.39 |
| 8,978,497 B2 | 3/2015 | Bourgoine et al. | |
| 9,334,936 B2 * | 5/2016 | Rosengren | F16H 25/20 |
| 9,431,868 B2 | 8/2016 | Rosengren et al. | |
| 9,676,067 B2 | 6/2017 | Ryu | |
| 9,797,817 B2 * | 10/2017 | McNaughton | G01N 33/54366 |
| 2003/0196502 A1 | 10/2003 | Sato et al. | |
| 2005/0109139 A1 | 5/2005 | Nagai et al. | |
| 2005/0132830 A1 | 6/2005 | Gerbier et al. | |
| 2005/0212363 A1 | 9/2005 | Okubo | |
| 2006/0113940 A1 * | 6/2006 | Nagai | H02K 7/06 318/434 |
| 2006/0235571 A1 * | 10/2006 | Baba | A61L 27/18 700/254 |
| 2008/0196521 A1 | 8/2008 | Chiang | |
| 2008/0272093 A1 | 11/2008 | Sato | |
| 2009/0239095 A1 | 9/2009 | Desai et al. | |
| 2012/0001499 A1 | 1/2012 | Makino et al. | |
| 2012/0043832 A1 | 2/2012 | Neff et al. | |
| 2013/0285494 A1 | 10/2013 | Iversen et al. | |
| 2017/0089436 A1 * | 3/2017 | Eyraud | F16H 25/2247 |
| 2017/0321795 A1 * | 11/2017 | Rosengren | H02K 5/1735 |
| 2020/0164457 A1 | 5/2020 | Rosengren et al. | |

FOREIGN PATENT DOCUMENTS

| | | |
|---|---|---|
| DE | 102010052918 A1 | 5/2012 |
| DE | 102012100387 A1 | 7/2012 |
| DE | 102016107388 A1 | 10/2017 |
| EP | 0209604 A1 | 1/1987 |
| EP | 1782909 A1 | 5/2007 |
| JP | S60117399 U | 8/1985 |
| JP | 2005172234 A | 6/2005 |
| WO | 0101209 A1 | 1/2001 |
| WO | 2014172036 A1 | 10/2014 |
| WO | 2015081915 A1 | 6/2015 |
| WO | 2015081951 A1 | 6/2015 |
| WO | 2017048788 A1 | 3/2017 |
| WO | 2020112318 A1 | 6/2020 |

OTHER PUBLICATIONS

PHD Litstore "Product Packers: 6441-264 Series LC Escapement Information Sheet, CAT-6441264" accessed Oct. 6, 2015 at <http://litstore.phdinc.com/documentDesc.asp?catID=68>, 6 pages.

International Search Report and Written Opinion dated Mar. 26, 2020 in connection with international patent application No. PCT/US2019/060033, 12 pages.

Series LC Single Rod Escapements (catalog). PHD, Inc., Jul. 11, 2012, Retrieved Jun. 26, 2014 from <http://litstore.phdinc.com/documentDesc.asp?catld=86>.

Lassner, E. et al., "Tungsten: Properties, Chemistry, Technology of the Element, Alloys, and Chemical Compounds." New York: Kluwer Academic/Plenum Publishers, 1998, ISBN 0-306-45053-4, p. 18.

Special Metals Corporation. "Inconel alloy 600 product literature", http://www.specialmetals.com; Accessed Jun. 26, 2014, Sep. 2008, 16 pages.

International Search Report and Written Opinion dated Jul. 9, 2021 in connection with International Patent Application No. PCT/US2021/028886, 13 pages.

* cited by examiner

INTEGRATED MOTOR LINEAR ACTUATOR

FIELD

This application is directed to linear actuator technology, including, but not limited to, linear actuator systems for robotic welding, automated machine tool systems, and other programmable tool applications. More generally, the disclosure relates to integrated motor linear actuator systems with advanced designs adapted for improved power-to-weight ratio, size envelope, stroke length and thermal performance.

BACKGROUND

This disclosure relates to linear actuators for use in automated machine tool systems, including robotic welding and other programmable tool applications. More generally, the disclosure relates to the thrust-bearing elements of a linear actuator system, including thrust tube and thrust rod components.

Industrial robots utilize a wide variety of different actuator technologies, in order to automate manufacturing processes including robotic welding, injection molding, fixture clamping, packaging, assembly, surface coating, and product inspection and testing. Other high-volume and precision production manufacturing applications are also included, particularly where machine tool speed, accuracy, endurance, service life and operational costs are important engineering factors.

In robotic welding and automated or programmable machine tool applications, actuators can be arranged to position a welding gun or similar apparatus with respect to a workpiece, using a linear actuator to position the electrode or end effector. Suitable applications include, but are not limited to, short-stroke clamping operations for arc, spot or resistance welding, projection welding, and friction stir welding. Linear actuators are also used in a range of other programmable tool applications, including robotic, pedestal, and fixture-type manufacturing operations.

Actuator speed, precision and service life remain important design factors across these different applications, along with system size and weight considerations. As a result, there is a continuing need for improved linear actuator designs, which can provide increased positioning accuracy with reduced deflection and tool displacement, within a desired tooling weight and size envelope, and a reasonable cost.

SUMMARY

A linear actuator system is disclosed. The system includes an actuator housing enclosing a motor and screw shaft, each extending along a common longitudinal axis. A nut assembly is engaged with the screw shaft, and coupled to a thrust tube. The thrust tube extends from a proximal end, which is engaged with the nut assembly and disposed at least partially within the actuator housing, to a distal end, which is disposed at least partially outside the housing. The thrust tube can be directly coupled with the nut assembly at the proximal end.

In various examples and embodiments, the linear actuator system includes the actuator housing extending along the longitudinal axis. A motor assembly including a stator is coupled to the actuator housing, with a rotor extending along the axis within the actuator housing. A screw shaft extends within the rotor, along the common longitudinal axis. A nut assembly is engaged with the screw shaft, and with a thrust tube extending from a proximal end, which can be directly coupled with the nut assembly, to a distal end, disposed at least partially outside the housing. The nut assembly is configured to convert rotational motion of the rotor about the longitudinal axis into linear motion of the thrust tube along the longitudinal axis.

Method embodiments include operating a motor having a stator and a rotor disposed about a screw shaft. The rotor rotates about a longitudinal axis, together with the screw shaft, driving a thrust tube along the longitudinal axis. The thrust tube can be directly coupled to a nut assembly in threaded engagement with the screw shaft. The thrust tube extends from a proximal end in direct physical engagement with the nut assembly to distal end subject to loading. Depending on embodiment, the method can also include providing rotational stability while loading the thrust tube; for example, the thrust tube can be supported with a bushing or bearing disposed proximate the distal end.

Apparatus embodiments includes a stator coupled to an actuator housing. A rotor is disposed within the actuator housing, proximate the stator, and screw shaft is disposed within the rotor, extending along an axis of the actuator housing. A nut assembly is engaged about a threaded portion of the screw shaft, and coupled with a thrust tube extending continuously along the axis from a proximal end to a distal end. A mechanical fitting defines a direct physical engagement between the proximal end of the thrust tube and the nut assembly; e.g., absent other additional load bearing components intervening between nut assembly and the proximal end of the thrust tube.

In addition to the representative examples and embodiments described here, other embodiments are also encompassed, as disclosed by reference to the drawings, and by study of the following description.

DETAILED DESCRIPTION

Figure 1:
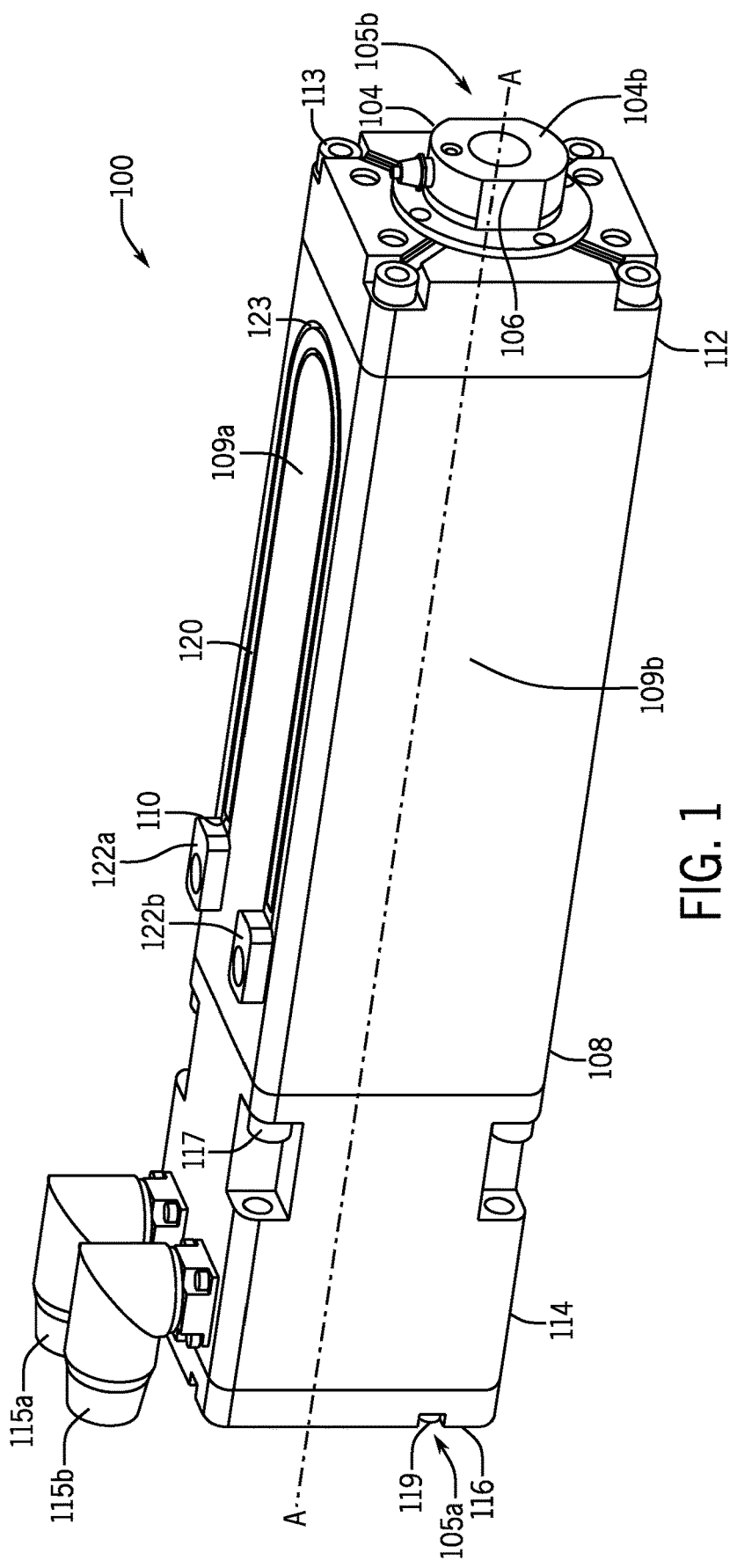
FIG. 1 is a front isometric view of a linear actuator system.

Linear actuator systems can be provided in a variety of different sizes and configurations, depending on application, service, and operational requirements. Integrated-motor actuator systems provide a compact, efficient design, with the central housing section also serving as the stator housing.

For example, a set of stator coils can be mounted to the inside the central housing section, with a rotor and screw shaft extending inside the stator, along the central axis. A nut assembly couples the rotor and screw shaft to a thrust tube or output rod, which moves longitudinally along the axis in response to rotation of the rotor.

Integrated motor actuators can be produced at relatively low cost with improved electromechanical efficiency and manufacturing advantages. Additional design benefits include high speed and positioning accuracy, with a reduced size envelope and improved power-to-weight ratio.

Weight can be an important design consideration in applications where the actuator device is typically carried by a robot, along with associated welding gun equipment or other machine tooling components. Less system weight also reduces loading on the robot arm, increasing speed and allowing for smaller robot systems with more precise positioning capability and higher rates.

The body portion of the actuator housing can be held together between end caps, for example using tie rods or similar mechanical fasteners. This design can also reduce weight, as compared to thicker-walled configurations, and improve the system's ability to cool the motor drive, which is also a consideration in applications requiring the device to perform at high repetition rates (e.g., more welds per minute), or with greater travel in each movement. Higher rates and greater travel distances both mean additional mechanical work output; that is, the motor drive needs to work harder, and the system thus generates more heat.

To address these concerns, the actuator configurations described here are adapted to accommodate a cooling assembly, for example an active water-cooled system or passive cooling structure. The addition of a cooling assembly can improve the motor capacity, for example up to two times or more, while maintaining acceptable system temperatures. In some embodiments the cooling assembly can be formed within the actuator housing, or otherwise permanently installed at the point of manufacture. In other embodiments, a modular cooling assembly can be adapted for selectively coupling (and decoupling) along one or more different sides or longitudinal section of the actuator housing.

Typical electric motor drives include an internal rotor, mounted with rotational bearings each end. The bearings are adapted to support the length of the rotor component in rotation about the longitudinal axis of the actuator, with precise clearance between the rotor and stator along the rotor length. In some configurations, the rotor can be supported by a single rotational bearing assembly at one end; e.g., at the proximal end, or between the proximal and distal ends. The rotor can also be provided in a short, standard or elongated configuration, with additional design features to reduce the mass and moment of inertia of the both the rotor and other components of the actuator drive.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, skill, and knowledge of the relevant art are within the scope of the present inventive aspects.

FIG. 1 depicts a linear actuator system 100, exemplary of the linear actuator systems discussed above and as described in greater detail below. The linear actuator system 100 is used to drive an output rod or thrust tube 104 in reciprocating motion along a longitudinal axis A.

In the configuration of FIG. 1, thrust tube 104 is positioned at least partially within the main body or central portion of the actuator housing 108. The thrust tube 104 extends along the longitudinal axis A from a first (proximal) end oriented toward the proximal end region 105a of the linear actuator system 100, inside the housing 108, to a second (distal) end 104b toward the distal end region 105b of the linear actuator system 100, outside the housing 108. In this particular example, the distal or output end 104b of the thrust tube 104 is positioned at the axial extreme of distal region 105b.

The distal end 104b of the thrust tube 104 can be coupled to a machine tool, workpiece, end effector, or other component. A motor assembly is positioned within the actuator housing 108, and configured to drive the thrust tube 104 in reciprocating motion along the longitudinal axis A. The thrust tube 104 moves generally between a first (retracted) position to a second (extended) position, in which the distal end 104b of the thrust tube 104 advances at least partially outside of actuator housing 108 and past the head assembly 112. This reciprocating motion between the first retracted position and the second extended position can be used to drive a machine tool in a corresponding fashion along the longitudinal axis A.

As used herein, the terms "proximal" and "distal" are defined with respect to the internal components of the linear actuator system 100, and any workpiece or tool coupling located on the output end 104b of the thrust tube 104, outside of the actuator housing 108. In particular, the term distal refers to the direction of the output end 104b of the thrust tube 104 that is at least partially outside of the housing 108 (and any workpiece or tooling component connected thereto), and the term proximal refers to the direction away from the output end 104b of the thrust tube 104 (and any connected workpiece or tool). Alternatively, the terms may be interchanged without loss of generality, depending on design or drawing convention.

The actuator housing 108 shown in FIG. 1 generally encloses a portion of the thrust tube 104. The actuator housing 108 further encloses a motor assembly and any other appropriate components that are used to drive the reciprocating motion of the thrust tube 104. Exemplary internal components are described in greater detail with respect to FIG. 2, including a motor assembly (e.g., magnets, windings, and rotors), bushings, bearings, and a nut assembly coupled to a lead screw or screw shaft for converting rotational motion of the rotor into reciprocating motion of the thrust tube 104 along central axis A.

The main or central portion of the actuator housing 108 can be formed by extruding or machining a generally hollow shape configured to enclose the motor assembly and other internal components, or as a multi-piece assembly. More generally, the actuator housing can encompass the main or central housing section 108 together with a head assembly 112, bearing block 114 and rear cover 116, attached together along the central axis A. As shown in FIG. 1, for example, the head assembly 112 is coupled to the distal end of the main housing 108 along the longitudinal axis A, in the distal region 105b of the actuator system 100, and the main bearing block 114 and rear cover 116 are coupled to central portion of the housing 108 in the proximal region 105a.

As described herein, the linear actuator system 100 converts rotational motion (e.g., of an internal screw) into reciprocating motion of the thrust tube 104. The main bearing block 114 can enclose various components adapted for precision control of the reciprocating motion, such as a rotary encoder that detects a rotational position of the internal screw and other control components or logic that uses the detected position to determine a reciprocated position of the thrust tube 104. Bearing block connectors 117 can be used to removably attach the main bearing block 114 to the actuator housing 108. In this configuration, the main bearing block 114 can be interchangeable, allowing the linear actuator to be used with a variety of different encoders, sensors, feedback mechanisms, and so on, as appropriate for a given application. As described herein, an adapter is provided to connect the screw shaft and other internal components of the actuator to be associated with different bearing blocks, including those having different sizes or configurations than the main bearing block 114 shown with respect to FIG. 1.

External connectors 115a, 115b are positioned at or on the main bearing block 114. The connectors 115a, 115b are used to connect the linear actuator system 100 to various external systems and processes. For example, the connectors 115a, 115b can be used to electrically connect the linear actuator system 100 to a power source. Additionally or alternatively, the connectors 115a, 115b can be used to provide a data connection between the linear actuator system 100 and an external computing device, which may be adapted to control one or more operations of the linear actuator system 100.

Connectors 115a, 115b are illustrative. Connectors 115a, 115b can be used to provide connections or links between the linear actuator system 100 and an external power supply, computing device, and other peripheral systems, or other connections can be used. As one example, a remote computing device may be wirelessly coupled with one or more internal components of the linear actuator system 100. As such, control signals and data outputs can be exchanged between the remote computing device and the linear actuator system 100 by wireless connection, according to various protocols.

The main bearing block 114 is shown connected to a rear cover 116. The rear cover 116 can be a plate or other closure that operates to close and seal an interior of the main bearing block 114 from an external environment. The rear cover 116 can also provide access to service or replace various components that are held within the main bearing block 114. As one example, the main bearing block 114 may include various sensors and other electronics that may be shielded by the rear cover 116. As shown in FIG. 1, rear cover connectors 119 such as bolts, screws or other mechanical connectors can be used to secure to rear cover 116 to the main bearing block 114. The rear cover connectors 119 can be manipulated in order to remove the rear cover 116 from the main bearing block 114 and allow for servicing of the components held therein.

A front head assembly 112 is removably attached to the actuator housing 108 at the distal end region 105b, for example using screws, bolts or similar front head connectors 113. As described herein, the front head assembly 112 houses an adjustable guide bushing that can provide stability to the thrust tube 104, as the thrust tube 104 travels in reciprocating motion along the longitudinal axis A. The front head assembly 112 in cooperation with the adjustable guide bushing 130 can also provide rotational stability to the thrust tube 104. As one example, the thrust tube 104 can define a flat 106 or other surface contour. The front head assembly 112 can include one or more features, include the adjustable guide bushing, with a correspondingly contoured feature that is key to the flat 106, thereby helping the thrust tube 104 maintain rotational stability as the thrust tube 104 travels along longitudinal axis A.

The linear actuator system 100 described herein also includes various cooling features, systems and assemblies that help reduce a temperature of the motor assembly contained within the actuator housing 108. In the example of FIG. 1, the linear actuator system 100 is shown as including a cooling loop 120. The cooling loop 120 can be at least partially embedded, potted or seated with a thermally conductive material 123, within a channel or recessed feature 110 defined in the actuator housing 108. The cooling loop 120 can be formed with the thermally conductive material 123 disposed at least partially about the cooling loop 120 to conduct heat from the actuator housing 108. The cooling loop 120 can include a hollow interior conduit or tube through which cooling fluid is routed. A first fluid coupling 122a and a second fluid coupling 122b can be used to couple the cooling loop 120 with a fluid source for circulating the cooling fluid. In some cases, the fluid couplings 122a, 122b can include inlet and outlet couplings, valves or quick-disconnect features adapted for removable attachment of the cooling loop 120 to conduit, hose or other fluid flow component configured to cycle fluid through the cooling loop 120.

The recessed feature 110 is shown formed in a first side 109a of the actuator housing 108. The cooling loop 120 is therefore at least partially embedded, potted or seated at the first side 109a of the actuator housing 108. The cooling loop 120 in the example of FIG. 1 conducts heat substantially from the first side 109a. A second side 109b, or other side of the actuator housing 108, remains substantially uncoupled from the cooling loop 120. It will be appreciated, however, that in other cases, multiple cooling loops can be provided, with corresponding recessed features formed in to each respective side, or all sides, of the actuator housing 108 as needed. Yet further, in other cases, the second side 109b or other side of the actuator housing 108 may be adapted to receive another cooling component, such as a modular cooling jacket or other cooling jacket that attaches to a side of the actuator housing 108 that is otherwise not associated with the cooling loop 120 shown in FIG. 1. In this configuration, the linear actuator system 100 can be tuned to provide the level of cooling as needed for a particular application.

Figure 2:
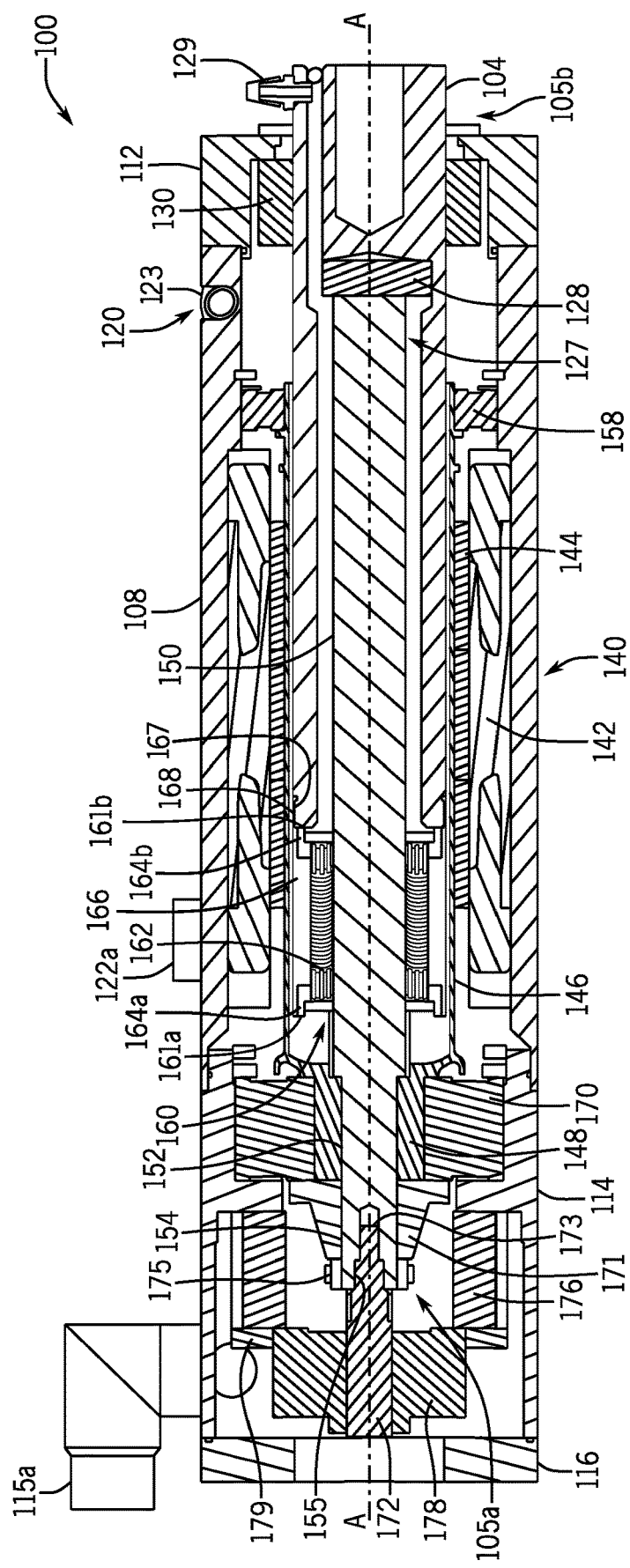
FIG. 2 is a cross-sectional view of the linear actuator system.

FIG. 2 is a cross-sectional view of the actuator system 100. In this particular configuration, linear actuator system 100 includes a motor assembly 140 disposed within the central portion of the actuator housing 108. A head assembly 112 is coupled to the central housing 108 in the distal end region 105b, e.g., using one or more front head connectors 113, or similar mechanical attachments. A bearing block 114 and rear cover 116 are connected to the central housing 108 at the proximal end 105a, opposite the head assembly 12, for example using one or more bearing block connectors 117 and rear cover connectors 119. Motor assembly 140 is located inside the central housing 108.

Motor assembly 140 typically includes a stator with a number of motor windings 142, magnets 144 (e.g., permanent magnets or electromagnets), and a rotor 146. For example, motor assembly 140 may be configured as a hollow shaft motor having one or more stationary (stator) motor windings 142, with a centrally located, hollow rotor 146 positioned radially inwardly of stator windings 142, inside actuator housing 108. Conversely, windings 142 are positioned radially outwardly of rotor 146, for example, being fixed to (or fixed relative to) actuator housing 108.

When motor assembly 140 is provided in hollow shaft or hollow rotor form, as shown in FIG. 2, rotor 146 may have generally cylindrical outer and inner surfaces, with stator windings 142 and rotor 146 surrounding a centrally located linear thrust mechanism that includes a threaded lead screw or screw shaft 150, with nut (or nut assembly) 160 directly coupled to the thrust tube, output rod, or other load transfer structure.

The thrust mechanism is configured to convert rotational motion of rotor 146 to linear movement of thrust tube 104. As shown in FIG. 2, for example, the thrust mechanism includes the externally threaded, elongated lead screw or screw shaft 150 in combination with an internally threaded nut assembly 160, positioned radially inward of and substantially surrounded by rotor 146. In this configuration, screw shaft 150 may include an externally threaded section, provided with threads along a substantial portion of the shaft length. As used herein, the terms "thread" and "threaded" may thus be used to define the main threaded section of screw shaft 150, including, but not limited to, conventional threads, Acme- or ACME-type threads, roller screw threads, ball nut threads, and other threaded features suitable to convert rotational motion of rotor 146 to linear motion of thrust tube 104.

Depending on design, the lead screw or screw shaft 150 may also include a proximal extension 152. Proximal extension 152 may be formed as an unthreaded, reduced diameter section at the proximal end of screw shaft 150. The proximal extension 152 extends through hub 148 and may be rotationally coupled thereto, for example, by providing the inner surface of hub 148 with a complementary taper, or with a lock and key arrangement.

Thrust bearing 170 can be positioned radially outward of hub 148 and configured to support hub 148 and the proximal extension 152 of screw shaft 150 within actuator housing 108. In some examples, the thrust bearing 170 can include a pair of bearings that are adapted to provide a higher force capacity. Accordingly, while FIG. 2 shows the thrust bearing 170 as a single bearing, two or more bearings can be provided at or adjacent the proximal end to support screw shaft 150 within the housing 108. Depending upon design, rotor 146 and hub 148 may be provided as a single, integrated component, or as separate parts. The proximal end of rotor 146 can also be rigidly connected with the axially extending (rotor mounting portion) of hub 148, so that rotation of rotor 146 causes a corresponding rotation of hub 148 and lead screw (or screw shaft) 150.

A feedback device or block 176, for example including an optional braking assembly, can also be arranged adjacent the proximal extension 152 of the screw shaft 150, with a mounting plate 179 facilitating attachment within the main bearing block 114. A rotary encoder 178 or other position sensor/controller may be mounted to the proximal extension 152 of screw shaft 150, utilizing an adapter 172. For example, a hollow shaft (incremental or absolute) encoder 178 can be coupled to the adapter 172 using a threaded connection or other mechanical means, with the rotation sensor element mounted directly onto the adapter 172. In turn, the adapter 172 can also be coupled to the screw shaft 150 in a manner that causes the adapter 172 to rotate with the rotation of the screw shaft 150. Accordingly, while the adapter 172 is shown in FIG. 2 for use with a hollow bore feedback device, other configurations are possible and contemplated herein. For example, feedback devices that do not require a hollow bore connection can be implemented, including those in which a direct coupling of device and adapter 172 and/or screw shaft 150 is utilized (e.g., such an Oldham coupler, threaded coupling, or other mechanical engagement).

In the example of FIG. 2, the screw shaft 150 includes a coupling feature or fitting 154 at a proximal end of the screw shaft 150. While many configurations are possible, the coupling feature 154 defines a proximal fitting 155 or socket that is adapted to receive the adapter 172. The adapter 172 can define an adapter fitting 173 that is a reduced diameter portion of the adapter 172. The adapter fitting 173 can be inserted into the proximal fitting 155 of the screw shaft 150. In some cases, the adapter fitting 173 and the proximal fitting 155 can define a press fit or interference fitting, or a threaded coupling. A lock nut 175 can also be provide to restrain the rotational and axial movement of the adapter 172 and the screw shaft 150 relative to one another.

A load distribution washer 171 is shown in FIG. 2 with the proximal extension 152 and the coupling feature 154 extending therethrough. The load distribution washer 171 can further enhance the stability of the screw shaft 150 during operation. The load distribution washer 171 can be pressed between the lock nut 175 and the thrust bearing 170/hub 148 along the longitudinal axis A, thereby providing a more evenly distributed load along the longitudinal axis A-A for the components configured for rotational motion thereabout.

The distal end of thrust tube 104 may be adapted for association with an adjustable guide bushing 130 that supports and stabilizes the distal end of the thrust tube 104 relative to actuator housing 108. For example, the adjustable guide bushing 130 may be generally arranged at the distal end 105*b* of the system 100. At the distal end 105*b*, the adjustable guide bushing 130 may be configured to provide axial and rotational stability to the thrust tube 104 as the thrust tube 104 reciprocates along the longitudinal axis A between a retracted and an extended state, as explained in detail with respect to FIG. 4. This can involve keying one or more contours of the adjustable guide bushing 130 to a corresponding contour of the thrust tube 104 (e.g., the flat 106 of FIG. 1).

In some embodiments, the distal end of rotor 146 may be provided with a ledge, recessed portion, or other feature to accommodate a secondary bearing 158 configured to support and stabilize the distal end of the rotor 146 relative to actuator housing 108. As one possibility, a secondary bearing 158 may be provided, which may be adapted to float or travel in an axial direction (parallel to rotational axis A of rotor 146 and lead screw 150), in order to accommodate thermal expansion of rotor 146 and other components.

The central portion of rotor 146 can be provided with a number of magnets 144, mounted either along the outer surface of rotor 146, or inlaid within the outer surface of rotor 146, adjacent the stator windings or coils 142. For example, rotor 146 can be machined to form axially-extending channels or grooves along the central portion of rotor 146, and magnets 144 can be inlaid within the grooves, between the corresponding (and radially thicker) axial rib sections. This also may provide rotor 146 with thicker wall sections at the proximal and distal ends, extending axially on either side of magnets 144.

An axial channel and rib structure reduces the mass and movement of inertia of rotor 146, so that less torque is required for angular acceleration and deceleration. The outer (proximal and distal) ends of rotor 146 can also be provided with a plurality of slots, holes or apertures extending through the wall sections, in order to further reduce inertia and torque requirements. Rotor 146 also provides for simple assembly of the motor 140, without additional tooling for alignment, while providing sufficient material to reduce or limit core saturation due to the high flux density of magnets 144, and reducing stray flux and flux leakage.

When motor assembly 140 is operated, rotor 146 rotates in a first (e.g., clockwise) or second (e.g., counter-clockwise) direction about longitudinal axis A. The proximal end of rotor 146 is connected to screw shaft 150 (e.g., via hub 148), so that rotation of rotor 146 results in a corresponding rotation of screw shaft 150, in either the first or second direction.

The nut assembly 160 may include internal threads, for example a recirculating ball screw or roller nut 162 which mates with external threads on the outer surface of screw shaft 150 to convert rotational motion of rotor 146 to linear (axial) motion of nut assembly 160. The nut assembly 160 and thrust tube 104 are directly coupled together, and thus move in unison along the longitudinal axis A when screw shaft 150 is rotated by rotor 146 of motor assembly 140.

The nut assembly 160 and the thrust tube 104 can be directly coupled to one another, absent additional intervening housing or bearing structures, providing linear actuator system 100 with a more compact design. Further, without additional housing or bearing structures, the screw shaft 150 can be oversized or generally larger than conventional designs relative to the dimensions of the actuator housing 108. In this manner, the actuator system 100 can provide enhanced torque relative to the size of the system 100, while using the cooling systems described herein to remove heat and maintain a temperature of the system 100.

In the example of FIG. 2, the nut assembly 160 includes a first end 161a adjacent the hub 148 and a second end 161b adjacent the thrust tube 104. The second end 161b directly abuts the thrust tube 104, for example at a mechanical coupling or fitting 167. A complementary fitting 168 is defined on the second end 161b of the nut assembly 160, for example a threaded coupling, press fit or interference fitting adapted for engagement with the fitting 167 on the proximal end 104a of the thrust tube 104. In this configuration, the thrust tube 104 can be directly coupled with the roller nut 162 or nut assembly 160, absent additional housing or load bearing structures between the mechanical coupling 168 on the second end 161b of the nut assembly 160 and the complementary fitting 167 on the proximal and of the thrust tube 104.

As shown in FIG. 2, the roller nut 162 is held within the nut assembly 160 by a carrier 166 that extends between the first and second ends 161a, 161b. In the example of FIG. 2, the carrier 166 defines the mechanical coupling 168 at the second end 161b of the nut assembly 160. End caps 164a, 164b can be provided at the respective first and second ends 161a, 161b, for structural support and to mitigate debris entry into roller nut 162. In some cases, the end caps 164a, 164b can define the mechanical coupling 168, alone or in conjunction with the carrier 166.

For example, nut assembly 160 and thrust tube 104 may move in a distal direction in response to a first (clockwise) rotation of rotor 146 and the lead screw or screw shaft 150, the output end of the thrust tube 104 away from the actuator housing 108 along axis A of the linear actuator system 100. Conversely, when motor assembly 140 drives rotor 146 and screw shaft 150 in the opposite (counter-clockwise) direction, nut assembly 160 and thrust tube 104 move in a proximal direction along the longitudinal axis A, retracting the thrust tube 104 into the actuator housing 108. For example, the thrust tube 104 can be retracted into an inner volume 127 of the actuator housing 108. A bumper 128 may be provided between the thrust tube 104 and the screw shaft 150 or other component of the system 100. The bumper 128 defines a deformable interface region between inner surface of the thrust tube 104 at working or output (distal) end, and the adjacent end of the screw shaft 150, cushioning impact and reducing contact forces at the inward-most position of thrust tube 104.

Alternatively, the threading configuration may be different, and the proximal and distal motions of thrust tube 104 may be reversed with respect to the rotation of screw shaft 150. Thus, motor assembly 140 is controllable to provide any desired linear or axial motion of thrust tube 104, and any workpiece or tooling connected thereto, based on the rotational motion of rotor 146 and screw shaft 150.

Figure 3:
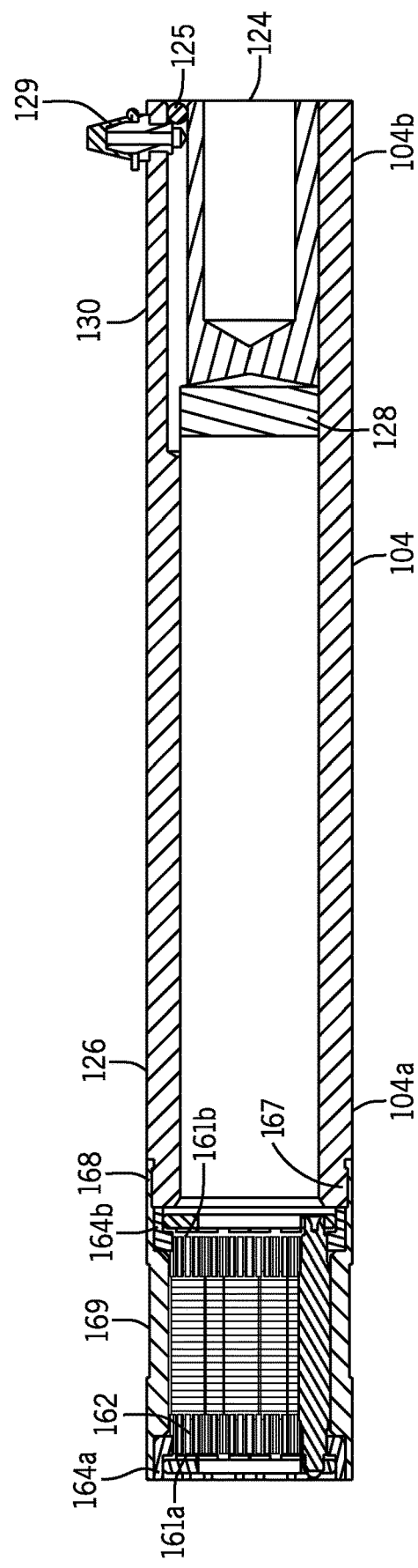
FIG. 3 is a cross-sectional view of a nut assembly and thrust tube for a linear actuator system.

FIG. 3 is a cross-sectional view of the nut assembly 160 and thrust tube 104, directly coupled to one another. The nut assembly 160 is shown directly engaged with a proximal end of the thrust tube 104. For example, the nut assembly 160 can extend continuously from the first end 161a to the second end 161b, with the second end 161b abutting the thrust tube 104. The nut assembly 160 and the thrust tube 104 can thus be directly coupled to one another, absent additional housing or bearing structure intervening between the nut assembly and the proximal end of the thrust tube.

As shown in FIG. 3, the mechanical coupling 168 can include a threaded coupling, press fit or interference fitting on the second end 161b of the nut assembly 160. The mechanical coupling 168 can be adapted to engage a complementary fitting or coupling 167 on the proximal end 104a of the thrust tube 104, opposite the distal and 104b, within a common outer diameter of the thrust tube 104 and nut assembly 160. For example, the nut assembly 160 may define a nut assembly outer surface 169 and the thrust tube 104 can define a thrust tube outer surface 126. The nut assembly outer surface 169 and the thrust tube outer surface 126 can be substantially continuous with one another, each having a common or similar outer diameter.

In this configuration, the directly coupled nut assembly 160 and the thrust tube 104 can be arranged within the rotor 146, with the rotor 146 adapted to accommodate and match the common outer diameter, with a desired tolerance, rather than being sized larger for additional intervening housing or bearing structures. In turn, the nut assembly 160 and the directly coupled thrust tube 104 can be configured to house an oversized or larger lead screw or screw shaft 150, facilitating the compact designs described herein with the enhanced torque due to the larger screw shaft 150 fitting in a more compact space.

In FIG. 3, the output (distal) end 104b of the thrust tube 104 is shown with a mechanical coupling or similar attachment fixture on the rod end 124. The rod end or attachment fixture 124 can be configured as threaded coupling or similar fixture for a machine tool component, located on the output (distal) end 104b of the thrust tube 104, outside the actuator housing 108. For example, an effector for a weld gun or other machine tool component can be coupled to the rod end 124, and driven in axial motion by the thrust rod 104.

The rod end (or fixture) 124 is typically positioned by thrust tube 104 at or adjacent the distal end 105b of the linear actuator system 100. The rod end 124 defines a common interface that allows the thrust tube 104 (and more generally, the linear actuator system 100) to engage a variety of different effectors and other machine tool components. The rod end 124 can also include a variety of engagement features, including pins, clamps, screws, grooves, locking mechanisms, and so forth, which are used to secure the effector or machine tool component to the thrust tube 104. For example, a weld electrode or similar machine tool component can be directly coupled or secured to the rod end 124, and move with the reciprocating motion of the thrust tube 104. Alternatively, an end effector or other load bearing component can be coupled to the rod end 124 in order to manipulate the machine tool, for example a welding gun arm.

Adjacent the tool attachment, a grease zerk or similar fitting 129 is provided on the distal end of the thrust tube 104, positioned at the distal end 105b of the actuator system 100. The grease zerk 129 can be used to receive a supply of lubricant for the inner volume 127. A seal 125, such as an O-ring can be mounted at the distal (output end) of the thrust tube 104, mitigating lubricant leakage.

Figure 4:
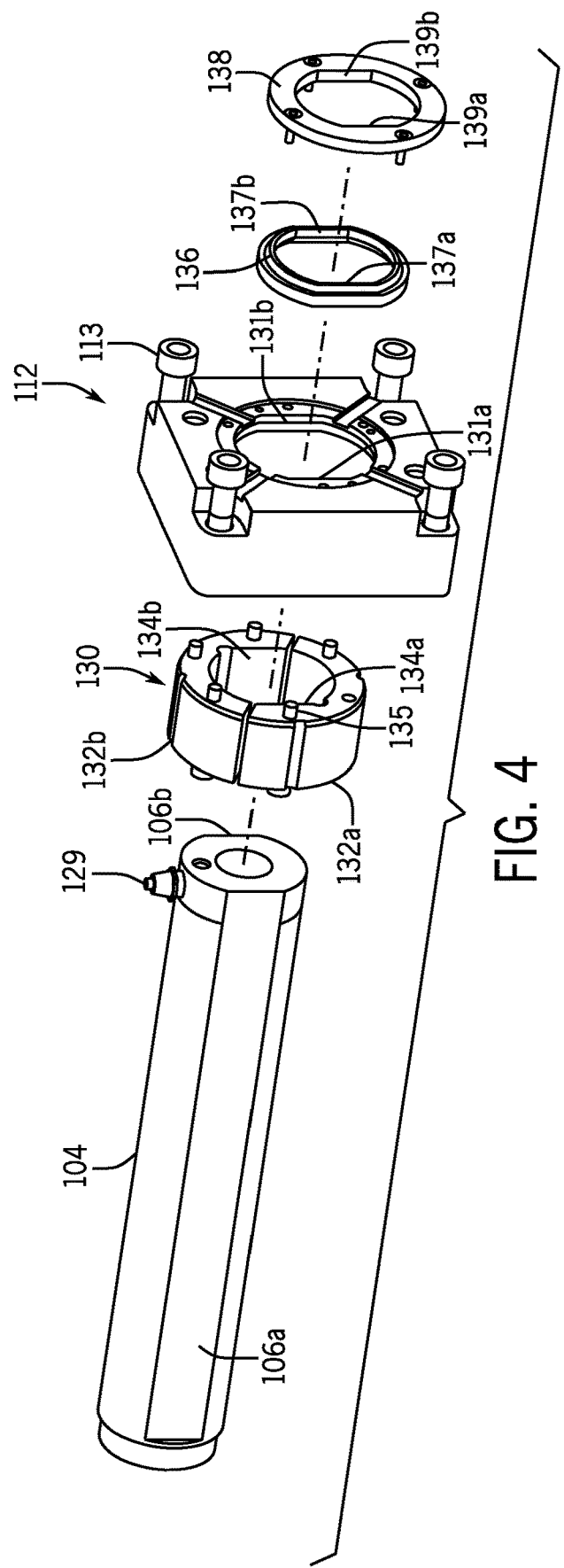
FIG. 4 is an exploded view of the thrust tube and a front-end bearing assembly for a linear actuator system.

FIG. 4 is an exploded view of the thrust tube 104 and the front head assembly 112. The front head assembly 112 generally closes the distal end 105b of the actuator housing 108 and helps provide stability to the thrust tube 104. For example, the front head assembly 112 include various components that cooperate to receive the thrust tube 104 and guide the reciprocal movement of the thrust tube 104, including the adjustable guide bushing 130, the thrust tube wiper 136 and the thrust tube scraper 138, as shown in FIG. 4.

In one example, the thrust tube 104 can include one or more surface contours that are keyed to corresponding features of the front head assembly 112 for reciprocal movement there along. In FIG. 4, the thrust tube 104 is shown with a first flat 106a and a second flat 106b. The first and second flats 106a, 106b can be positioned on opposing sides of the thrust tube 104 and define a substantially flat or planar contour along the longitudinal dimension of the thrust tube 104. In other examples, the thrust tube 104 can include more or fewer flats, including flats in different positions and configurations.

The flats 106a, 106b can be keyed or matched to corresponding contours of the front head assembly 112. In this configuration, the front head assembly 112 can receive the thrust tube 104, and the flats 106a, 106b can mitigate rotational movement of the thrust tube 104 as the thrust tube reciprocates along the longitudinal axis. For example, the adjustable guide bushing 130 can provide a first bushing portion 132a and a second bushing portion 132b that receive the thrust tube 104 within the front head assembly 112. The first bushing portion 132a can define a first keyed contour 134a and the second bushing portion 132b can define a second keyed contour 134b. The adjustable guide bushing 130 can be adapted to receive the thrust tube 104 with the flat 106a engaged with the first keyed contour 134a and the flat 106b engaged with the second keyed contour 134b. As the thrust tube 104 reciprocates through the adjustable guide bushing 130, the keyed contours 134a, 134b thus impair rotational movement of the thrust tube 104, due to the engagement with the respective ones of the flats 106a, 106b. Pins 135 are provided to install the adjustable guide bushing 130 in the system 100.

As shown in FIG. 4, the flats 106a, 106b can be further keyed to contours of the front head assembly 112, such as the first front head contour 131a and the second front head contour 131b. Similarly, the thrust tube wiper 136 can include a first wiper engagement contour 137a, second wiper engagement contour 137b for engagement with the first and second flats 106a and 106b. The thrust tube scraper 138 is also shown the first scraper engagement contour 139a and the second scraper engagement contour 139b for engagement with the first and second flats 106a, 106b.

Figure 5:
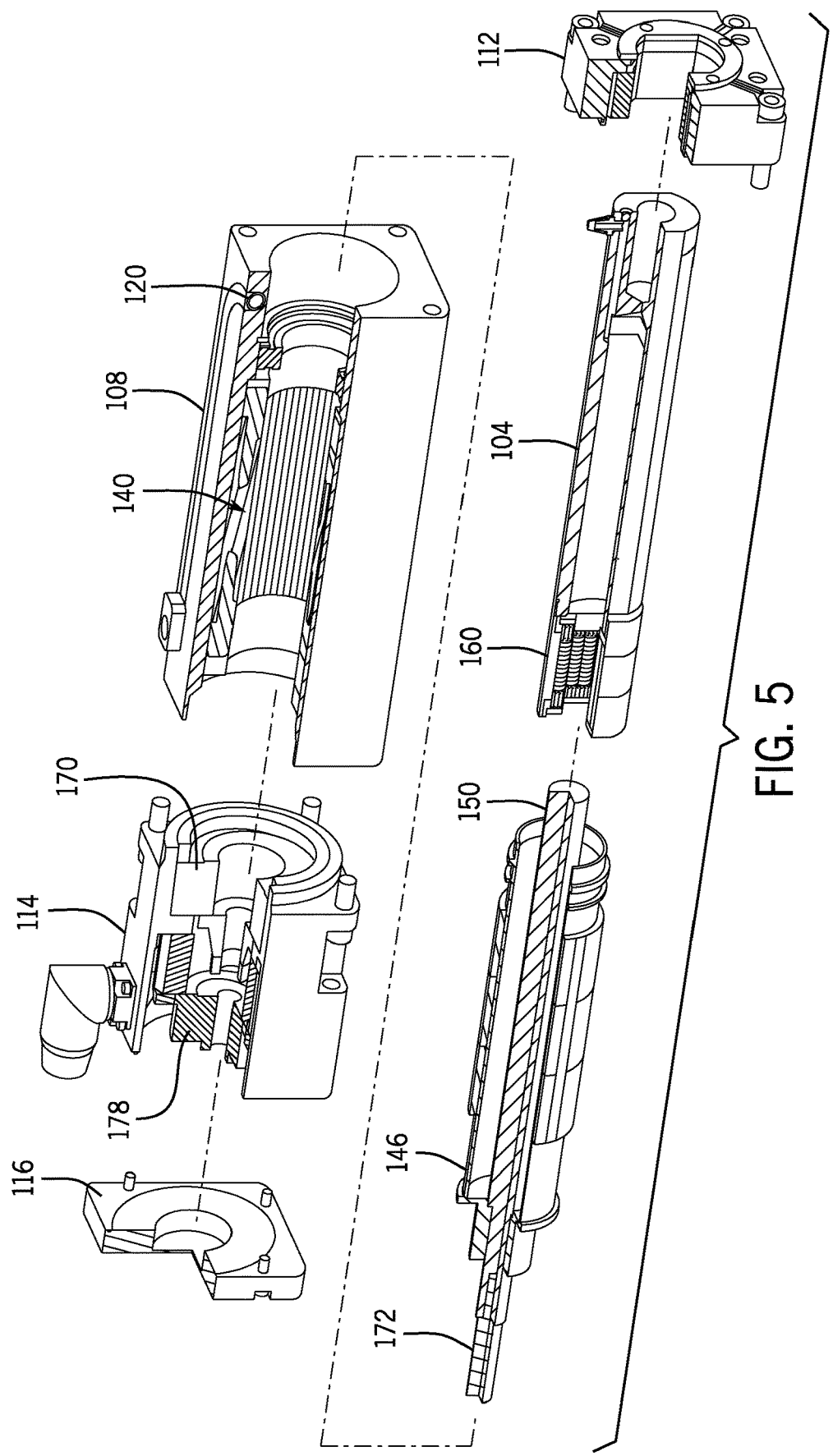
FIG. 5 is an exploded view of a linear actuator system, including a motor assembly and screw shaft.

FIG. 5 is an exploded view of linear actuator system 100, including a motor assembly 140, lead screw or screw shaft 150 and nut assembly 160 directly coupled to the thrust tube 104. As shown in FIG. 5, the directly coupled nut assembly 160 and thrust tube 104 are adapted to receive the screw shaft 150, with the nut assembly 160 engaged with the external outer threads of the screw shaft 150. The rotor 146 extends along and over the directly coupled nut assembly 160 and thrust tube 104 so that the nut assembly 160 and the thrust tube 104 fit in an annular space between the screw shaft 150 and the rotor 146.

The rotor 146 is positioned within the actuator housing 108, adjacent the cooling loop 120. The cooling loop 120 is therefore arranged to remove heat from the motor assembly 140 through the actuator housing 108. The adapter 172 is shown in FIG. 5 as connected to the screw shaft 150. The adapter 172 generally operates to couple the screw shaft 150 to the encoder 178 of the main bearing block 114. The adapter 172 can have an appropriate length in order to extend from the screw shaft 150 to the encoder 178. In this manner, the screw shaft 150 and actuator system 100 can be manufactured separately from the encoder 178 and main bearing block 114, with the adapter 172 tuned to effectively extend a length of the screw 150 to meet the specific characteristics of the encoder 178. As an illustration, different types or configurations of encoders may have different sizes. The actuator system 100 can include a common sized screw shaft 150 and the adapter 172 can be any one of a variety of different sizes to connect the commonly sized screw shaft 150 to the specific encoder of a given application.

Figure 6:
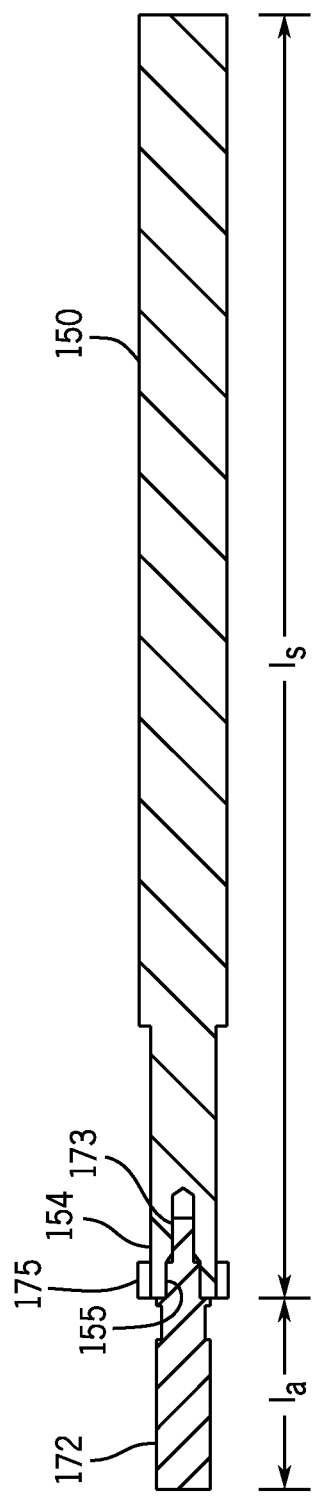
FIG. 6 is a cross-sectional view of the screw shaft, showing roller screw and adapter portions.

FIG. 6 is a cross-sectional view of the lead screw or screw shaft 150 and adapter 172. The screw shaft 150 can have a shaft length $l_s$ and the adapter 172 can have an adapter length $l_a$. Generally, the shaft length $l_s$ can be a length value that is standardized across a series or particular model of actuator system 100. The adapter 172 can have an adapter length $l_a$ that is tailored to the requirements of the encoder 178.

Figure 7:
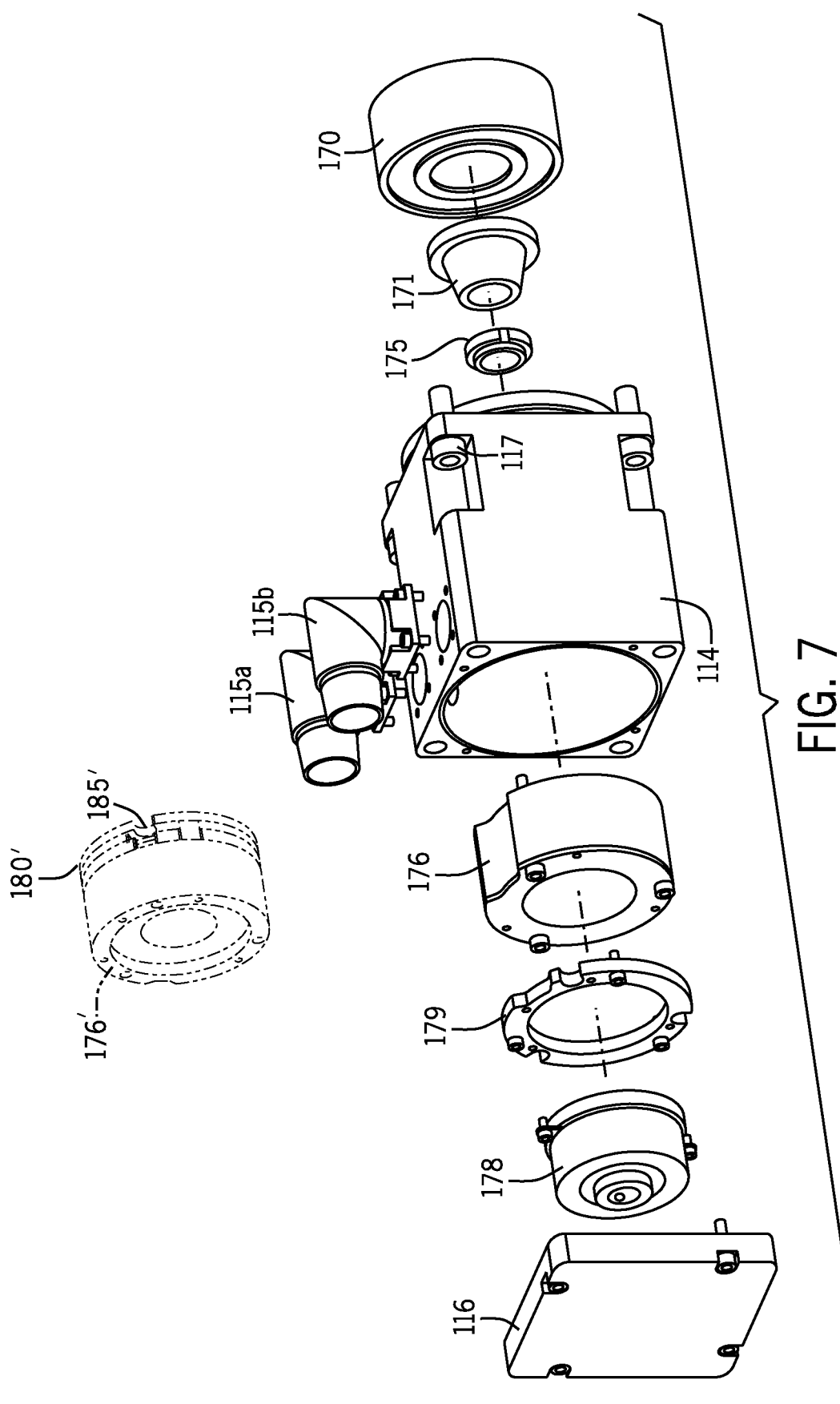
FIG. 7 is an exploded view of a back-end bearing block assembly for a linear actuator system.

FIG. 7 is an exploded view of the main bearing block 114 assembly for a linear actuator system 100. As shown in FIG. 7 and as described above, the main bearing block 114 can be associated with or otherwise include the connectors 115a, 115b, the rear cover 116, the thrust bearing 170, the distribution washer 171, the lock nut 175, the feedback device or feedback block 176, the rotary encoder 178 and the mounting plate 179. In some cases, an alternate feedback block 176' can be substituted for the feedback block 176. Suitable feedback blocks 176' can include an integrated pilot feature 180' with braking assembly 185'. In this configuration, the braking assembly 185' is configured to brake rotation of the screw shaft responsive to feedback from the resolver or encoder 178. Other variations of the feedback block 176 or 176' may be provided, and are encompassed in the disclosure here.

Figure 8:
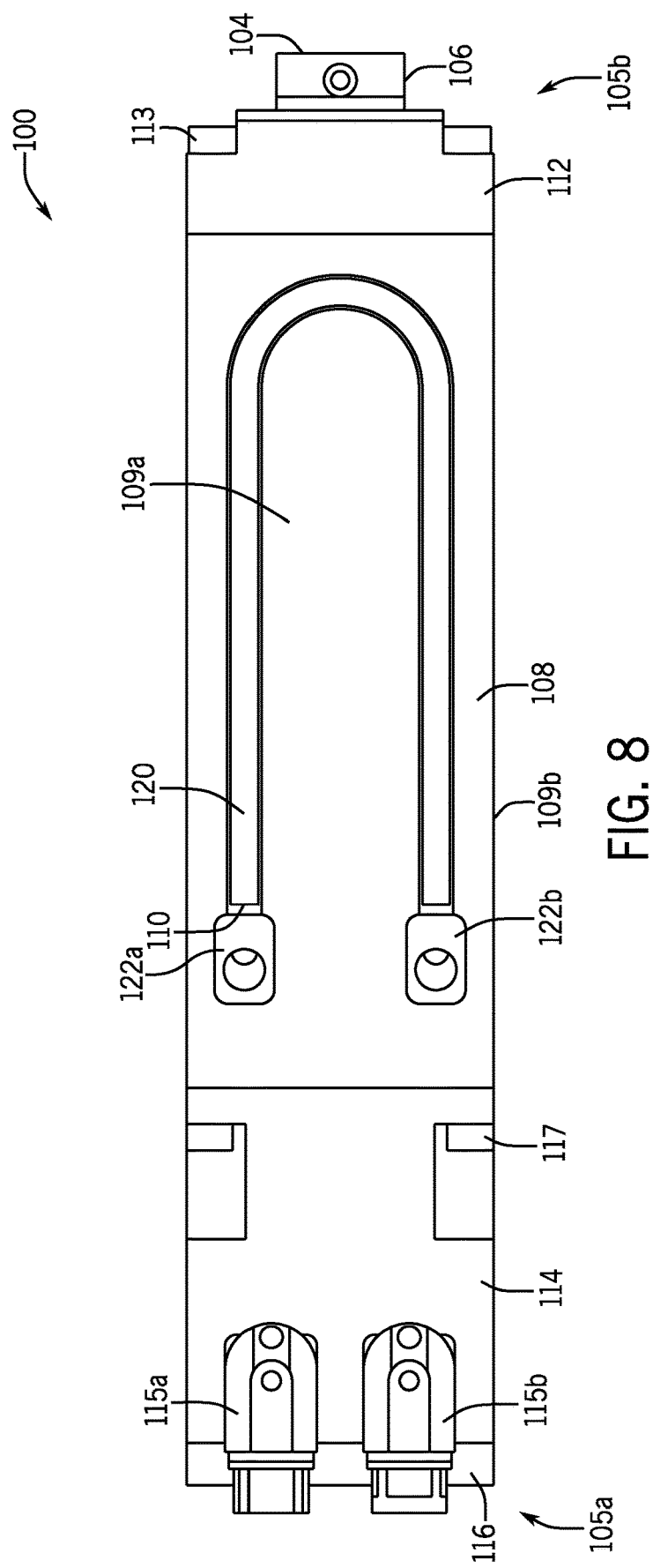
FIG. 8 is a top view of a linear actuator system, showing a cooling assembly for the actuator housing.

FIG. 8 is a top view of the linear actuator system 100. In the top view, the cooling loop 120 is shown coupled with the actuator housing 108. For example, the actuator housing 108 can define the recessed feature 110 with the first side of the actuator housing 108. The recessed feature 110 can be sized and shaped in a manner so that the cooling loop 120 can be at least partially embedded, potted or seated within the actuator housing 108, along the selected side. In the example of FIG. 8, the cooling loop 120 extends along the recessed feature 110 from the first fluid coupling 122a near the proximal end 105a of the actuator housing 108 toward the distal end 105b of the actuator housing 108 and back to second fluid coupling 122b near the proximal end 105a. In this manner, the cooling loop 120 can resemble a U-shaped conduit. In other examples, the cooling loop 120 can be defined by other geometries, including geometries in which the cooling loop 120 extends the actuator housing 108 multiple times, such as extending in a serpentine pattern between the near the proximal and distal ends 105a, 105b, similar to a radiator or other cooling structure.

Figure 9:
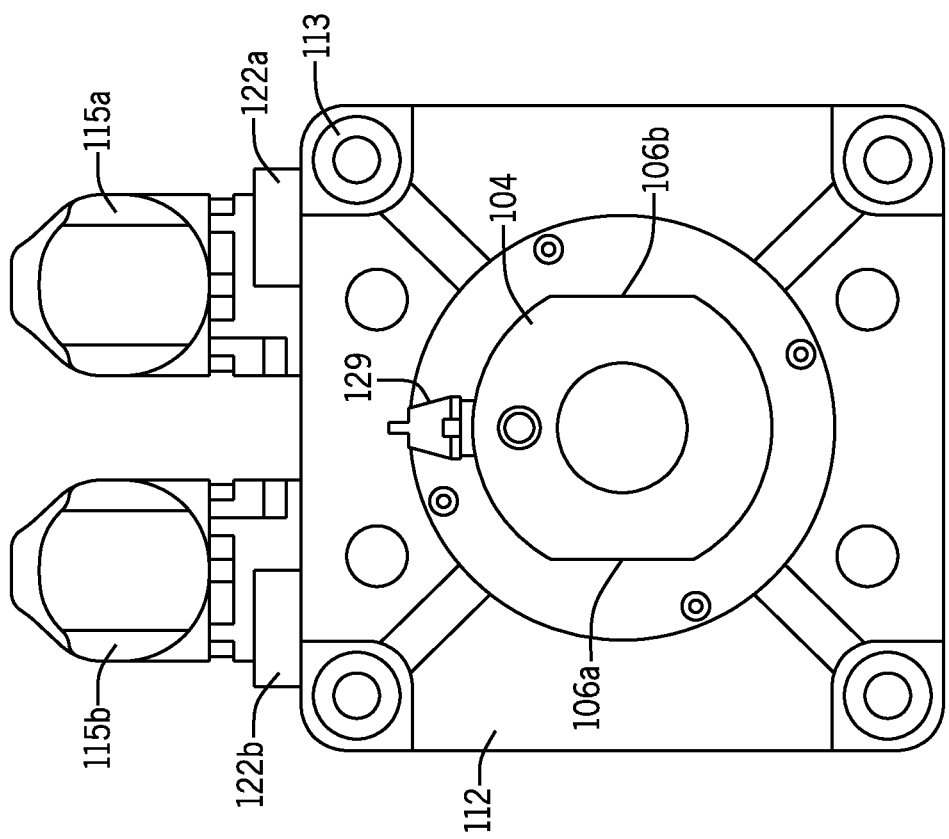
FIG. 9 is a front view of the linear actuator system, showing an anti-rotation feature for the thrust tube.

FIG. 9 is a front view of the actuator system 100, showing an anti-rotation feature for the thrust tube 104. As illustrated in the front view, the thrust tube 104 can include flats 106a, 106b on opposing sides. The front head assembly 112 can include one or more components that are keyed to the flats 106a, 106b. For example and as described above, the front head assembly 112 can housing a guide bushing and other features that have contours matching those of the flats 106a, 106b. In this manner, as the thrust tube 104 reciprocates, the thrust tube 104 may be prevented from rotational movement.

Figure 10:
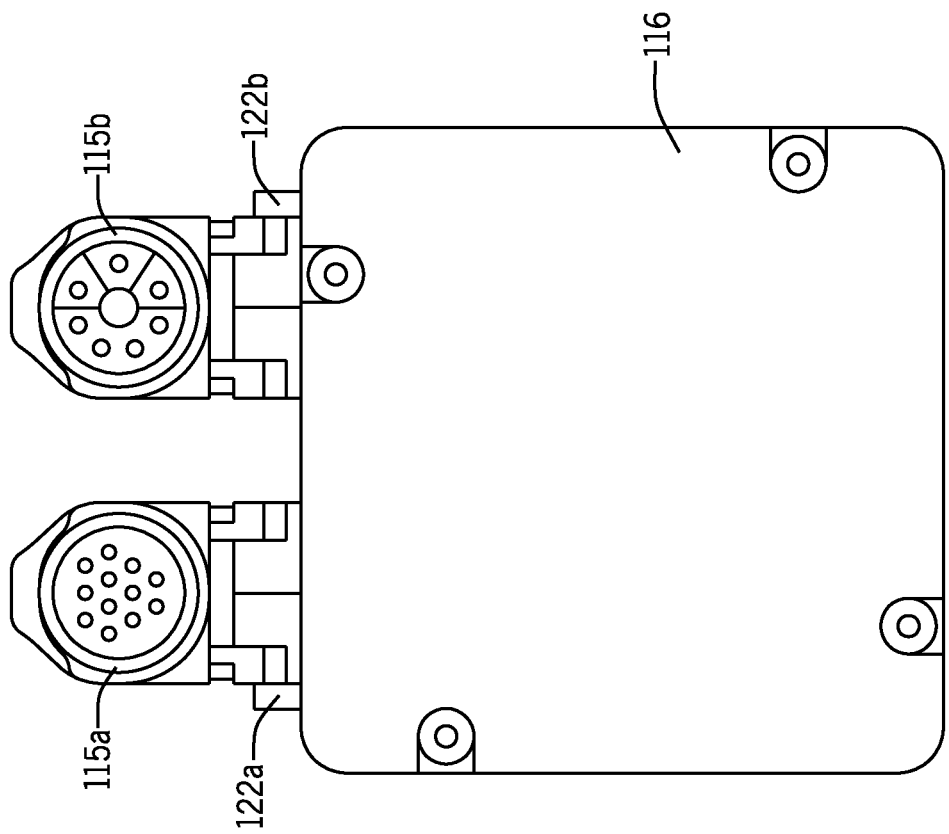
FIG. 10 is a back view of the liner actuator system, showing connectors for power and control communications.

FIG. 10 is a back view of the actuator system 100. In the back view, the connectors 115a, 115b are shown. The connectors 115a, 115b can be adapted for power and control communications. For example, one or both of the first connector 115a and the second connector 115b can be used to connect the linear actuator system 100 to a power supply, remote computing unit, and other external system or process. Each of the first connector 115a and the second connector 115b can be configured to connect the linear actuator system 100 to distinct systems. For example, the first connector 115a may be configured to connect the linear actuator system 100 to a power supply and the second connector 115b may be configured to connect the linear actuator system 100 to a remote computing unit. In other cases, more or fewer connectors may be provided, as may be appropriate for a given application.

Figure 11:
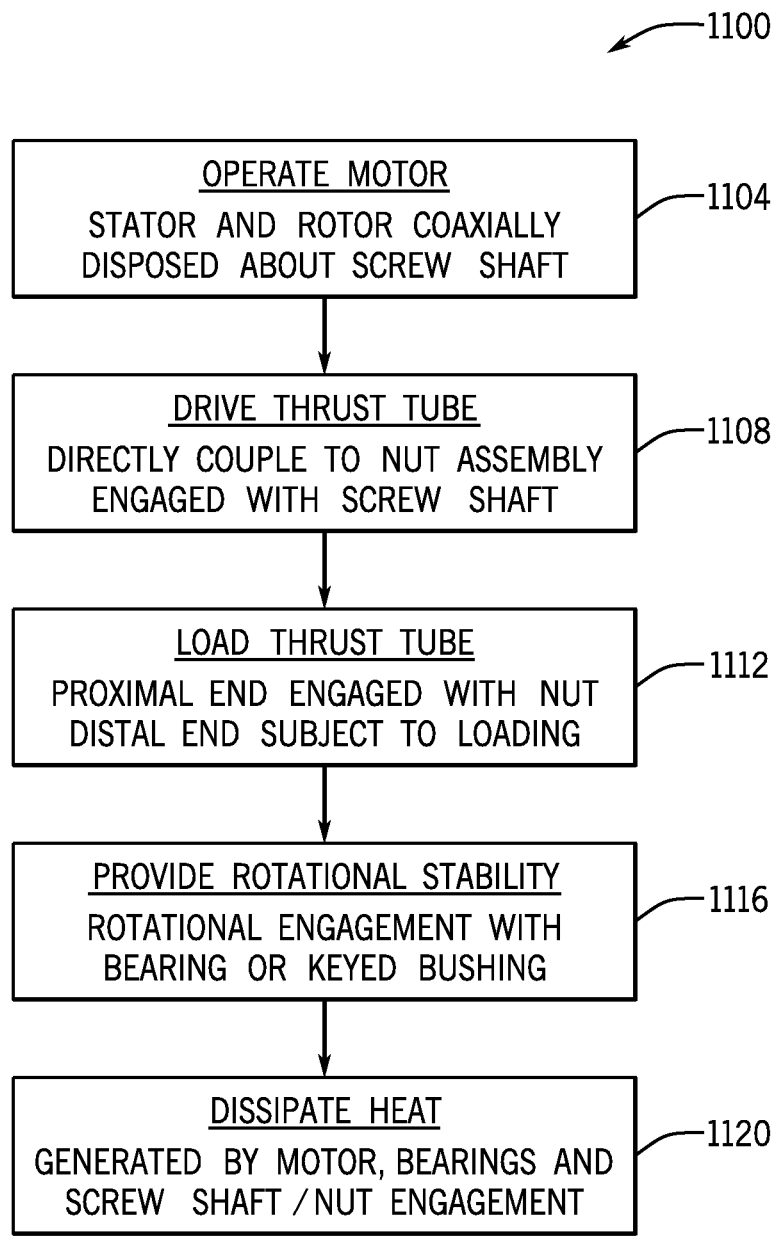
FIG. 11 is a flow diagram illustrating a method for operating a linear actuator system.

FIG. 11 is a flow diagram illustrating a process or method 1100 for operating a linear actuator system. For example, process 1100 may be used with a linear actuator system 100, in any of the examples and embodiments described herein. While the specific operations of method 1100 are presented in a particular arrangement, method 1100 may include more, fewer or different steps than those that are illustrated, consistent with the teachings of this disclosure. The operations of method 1100 can also be performed in any order or combination, with or without any of the additional processes and techniques described herein.

At operation 1104, the motor of the linear actuator is operated. The motor has a stator and a rotor disposed about a screw shaft of a linear actuator. The rotor rotates about a longitudinal axis. For example and with reference to FIG. 2, the motor assembly 140 of the linear actuator system 100 is operated. The stator windings or coils 142 and the rotor 146 are disposed about the lead screw or screw shaft 150. The rotor 146 rotates about the longitudinal axis A-A.

At operation 1108, a thrust tube is driven along the longitudinal axis. The thrust tube is directly coupled to a nut assembly in threaded engagement with the screw shaft. For example and with reference to FIG. 2, the thrust tube 104 is driven in reciprocating movement along the longitudinal axis A-A. The thrust tube 104 is directly coupled to the nut assembly 160. In one example, directly coupling the thrust tube 104 and the nut assembly 160 can include a direct physical engagement between the nut assembly 160 and the proximal end of the thrust tube 104, absent additional housing or bearing structures intervening there between. The nut assembly 160 is in threaded engagement with the screw shaft 150.

At operation 1112, the thrust tube is loaded. The thrust tube extends from a proximal end in direct physical engagement with the nut assembly to a distal end subject to the loading. For example and with reference to FIGS. 2 and 3, the thrust tube 104 can be loaded at the rod end or attachment fixture 124. In one example, the rod end 124 can be coupled with a weld electrode or weld gun effector for use in resistance welding operations.

There may be substantial mechanical loading on the weld electrodes in order to provide the mechanical coupling required to ensure high quality welds. The greater the axial mechanical loading and radial (inductive) loading due to the weld current, the greater the potential for displacement of the rod end 124 and associated weld electrode. The inductive reaction forces can cause the welding gun and actuator assembly to deflect off axis, causing the electrodes to slip or skid out of the desired position and potentially impacting weld quality.

At operation 1116, rotational stability is provided to the thrust tube. The thrust tube is supported with a bushing or bearing proximate the distal end. For example and with reference to FIGS. 2 and 4, the adjustable guide bushing 130 supports the thrust tube 104. The adjustable guide bushing 130 includes the keyed contours 134a, 134b that are adapted for engagement with corresponding ones of the flats 106a, 106b of the thrust tube 104. As the thrust tube 104 reciprocates along the longitudinal axis A-A, the adjustable guide bushing 130 can therefore mitigate rotational movement of the thrust tube 104, with the first and second bushing portions 132a, 132b preventing rotational movement of the thrust tube 104.

At operation 1120, heat is dissipated with a cooling loop. For example, and with reference to FIGS. 2 and 8, the cooling loop 120 can be partially embedded, potted or seated within the actuator housing 108. In some cases, the actuator housing 108 can define a recessed feature 110 with the cooling loop 120 positioned at least partially therein. The cooling loop 120 extends along the actuator housing 108 and along the stator and rotor disposed about the screw shaft. A thermally conductive material 123 can be at least partially disposed about the cooling loop 120 conducting the heat from the housing to the cooling loop 120.

EXAMPLES

Systems devices and techniques related to linear actuators are disclosed herein. A linear actuator generally includes a thrust tube configured for reciprocating motion along a longitudinal axis. A distal end of the thrust tube is configured to engage a machine tool, such as a welding, crimping, clamping, or other tool, thereby allowing the linear actuator to drive the machine tool in reciprocating motion with the thrust tube. The linear actuator can be used in an automated assembly or manufacturing and other settings where the distal end of the thrust tube is subject to loading, including both axial (e.g., mechanical) loading and transverse or radial (e.g., mechanical or current-based inductive) loading, which generates forces tending to displace the thrust tube at the distal end.

As described herein, a nut assembly directly couples a rotor and screw shaft to the thrust tube to provide a compact, efficient design. Additionally, the actuator configurations described herein have the ability to accept a modular water cooling assembly, or other active or passive modular cooling unit. The addition of the cooling assembly adds to the motor capacity, allowing the actuator to operation with a higher-capacity, while maintaining acceptable system temperatures. While it will be appreciated that a variety of examples and implementations are within the scope and spirit of the disclosure and appended claims, a number of examples and refinements are described below for purposes of illustration.

Thus, the examples are not targeted to be exhaustive or to limit the disclosure to the precise forms disclosed, and it will be apparent to one of ordinary skill in the art that many modifications and variations are possible in view of the above teachings.

Example 1. As a first example, a linear actuator system is disclosed. The linear actuator system includes an actuator housing extending along a longitudinal axis. The linear actuator system further includes a motor assembly including a stator coupled to the actuator housing and a rotor extending within the actuator housing. The linear actuator system further includes a screw shaft extending within the rotor, along the longitudinal axis. The linear actuator system further includes a nut assembly engaged with the screw shaft. The linear actuator system further includes a thrust tube extending from a proximal end directly coupled with the nut assembly to a distal end disposed at least partially outside the housing. The nut assembly is configured to convert rotational motion of the rotor about the longitudinal axis to linear motion of the thrust tube along the longitudinal axis.

A number of feature refinements and additional features are applicable in the first example and contemplated in light of the present disclosure. These feature refinements and additional features may be used individually or in any combination. As such, each of the following features that will be discussed may be, but are not required to be, used with any other feature combination of the first example.

To illustrate, in an embodiment, the nut assembly is directly engaged with the proximal end of the thrust tube. The nut assembly is adapted for driving the distal end of the thrust tube between a first retracted position proximate the actuator housing to a second extended position spaced from the actuator housing, absent additional housing or bearing structure intervening between the nut assembly and the proximal end of the thrust tube.

In another embodiment, the nut assembly extends continuously from a first end opposite the thrust tube to a second end abutting the thrust tube. The nut assembly further includes a mechanical coupling defined on the second end, in direct physical engagement with the proximal end of the thrust tube. The mechanical coupling can also include a threaded coupling, press fit or interference fitting on the second end of the nut assembly and adapted to engage the proximal end of the thrust tube within a common outer diameter of the thrust tube and of the nut and screw assembly.

In another embodiment, the nut assembly includes a roller nut engaged about a threaded portion of the screw shaft and extending continuously from a first end opposite the thrust tube to a second end abutting the thrust tube. In this configuration, the nut assembly can include a mechanical coupling on the second end of the roller nut, in direct physical engagement with the proximal end of the thrust tube.

In another embodiment, a cooling loop is at least partially embedded, potted or seated within the actuator housing, with a thermally conductive material disposed at least partially about the cooling loop to conduct heat from the actuator housing. The cooling loop can include a conduit for fluid flow and further comprising a recessed feature defined along a selected side of the actuator housing to accept the conduit and thermally conductive material.

In another embodiment, a cooling channel is formed or machined into a major body portion of the actuator housing. A cooling loop extends along the channel from a first end in a proximal portion of the actuator housing toward a distal portion of the actuator housing and back to a second end in the proximal portion, adjacent the first end.

In another embodiment, the stator is coupled to an inner surface of the actuator housing and the rotor is disposed about the screw shaft and nut assembly. The thrust tube is disposed radially inward of an annular region defined between an outer diameter of the nut and screw assembly and an inner surface of the rotor.

In another embodiment, the linear actuator system further includes an adapter rotationally coupled with a threaded portion of the screw shaft and extending along the longitudinal axis to an operable coupling with a controller at a proximal end of the actuator housing, opposite the thrust tube. The controller includes a resolver or encoder configured to determine a rotational position of the screw shaft via the operative coupling with the adapter.

In another embodiment, the linear actuator system further includes a braking assembly disposed about the adapter between the threaded portion of the screw shaft and controller. The braking assembly is configured to brake rotation of the screw shaft responsive to feedback from the resolver or encoder.

In another embodiment, a bushing or bearing is disposed about the thrust tube proximate the distal end. The bushing or bearing is keyed a flat or perimeter contour feature adapted to prevent rotation of the thrust tube in linear motion along the longitudinal axis.

Example 2. As a second example, a method is disclosed. The method includes operating a motor having a stator and a rotor disposed about a screw shaft. The rotor rotates about a longitudinal axis of the screw shaft. The method further includes driving a thrust tube along the longitudinal axis. The thrust tube is directly coupled to a nut assembly in threaded engagement with the screw shaft. The method further includes loading the thrust tube. The thrust tube extends from a proximal end in direct physical engagement with the nut assembly to distal end subject to the loading. The thrust tube further includes providing rotational stability to the thrust tube. The thrust tube is supported with a bushing or bearing proximate the distal end.

A number of feature refinements and additional features are applicable in the second example and contemplated in light of the present disclosure. These feature refinements and additional features may be used individually or in any combination. As such, each of the following features that will be discussed may be, but are not required to be, used with any other feature combination of the second example.

To illustrate, in an embodiment, driving the thrust tube includes direct physical engagement between the nut assembly and the proximal end of the thrust tube, absent additional housing or bearing structures intervening between. In this configuration, the nut assembly can extend continuously about the screw shaft from a first end opposite the thrust tube to a second end abutting the thrust tube. Accordingly, the direct physical engagement can include a threaded coupling, press fit or interference fitting defined on the second end. In some cases, loading the thrust tube can include the threaded coupling or fitting receiving the proximal end of the thrust tube within an outer diameter of the nut assembly.

In another embodiment, providing rotational stability can include the bushing or bearing being keyed to prevent rotation of the thrust tube when driven along the longitudinal axis. For example, the thrust tube can include at least one flat or perimeter contour feature adapted to prevent the rotation when engaged with a complementary flat or perimeter contour feature in the bushing or bearing.

In another embodiment, the method further includes dissipating heat with a cooling loop at least partially embedded, potted or seated within a housing extending about the stator and rotor disposed about the screw shaft, with a thermally conductive material at least partially disposed about the cooling loop conducting the heat from the housing to the cooling loop.

In another embodiment, the method further includes determining a rotational position of the screw shaft with a controller comprising a resolver or encoder. The resolver or encoder is operably coupled with an adapter extending along the longitudinal axis from an operational coupling with the resolver or encoder to a rotational coupling with a threaded portion of the screw shaft. Further, the method also include braking rotation of the screw shaft with a braking assembly arranged about the adapter, responsive to feedback from the controller.

Example 3. As a third example, an apparatus is disclosed. The apparatus includes a stator coupled to an actuator housing. The apparatus further includes a rotor disposed within the actuator housing, proximate the stator. The apparatus further includes a screw shaft disposed within the rotor, extending along an axis of the actuator housing. The apparatus further includes a nut assembly engaged about a threaded portion of the screw shaft. The apparatus further includes a thrust tube coupled with the nut assembly. The thrust tube extends continuously along the axis from a proximal end to a distal end. A mechanical fitting defines a direct physical engagement between the proximal end of the thrust tube and the nut assembly, absent additional load bearing components intervening there between.

A number of feature refinements and additional features are applicable in the third example and contemplated in light of the present disclosure. These feature refinements and additional features may be used individually or in any combination. As such, each of the following features that will be discussed may be, but are not required to be, used with any other feature combination of the third example.

To illustrate, in an embodiment, the mechanical fitting comprises a threaded coupling, press fit or interference fitting configured to accept the proximal end of the thrust tube within an outer diameter of the nut assembly, absent additional housing or bearing structure intervening in an annular region defined between the outer diameter of the nut assembly and an inner surface of the rotor.

In another embodiment, the apparatus includes a cooling loop at least partially embedded, potted or seated within a recessed feature defined in a major body portion of the actuator housing. A thermally conductive material is disposed at least partially about the cooling loop to conduct heat from the actuator housing.

In another embodiment, the apparatus further includes an adapter rotationally coupled to the threaded portion of the screw shaft and extending along the axis to an operational coupling with an encoder. The encoder is configured to determine a rotational position of the screw shaft via the operative coupling with the adapter. In some cases, a braking assembly is arranged along the adapter with a feedback device mounted to the braking assembly using a pilot feature. The braking assembly is configured to brake rotation of the screw shaft responsive to operation of the feedback device.

While this disclosure is made with reference to particular examples and embodiments, changes can be made and equivalents may be substituted without departing from scope of the invention as claimed. Modifications can also be made to adapt these teachings to different industries, materials, and technologies, not limited to the particular examples that are disclosed, and encompassing all embodiments falling within the language of the appended claims.

The invention claimed is:

1. A linear actuator system comprising:
   an actuator housing extending in an axial direction along a longitudinal axis;
   a motor assembly including a stator coupled to the actuator housing and a rotor extending within the actuator housing;
   a screw shaft extending within the rotor, along the longitudinal axis;
   a nut assembly comprising a nut engaged with the screw shaft;
   a thrust tube extending from a proximal end directly coupled with the nut assembly to a distal end disposed at least partially outside the actuator housing;
   a hub rotationally coupled to a proximal end of the screw shaft and a proximal end of the rotor, adjacent the nut assembly;
   a thrust bearing positioned radially outward of the hub at the proximal end of the screw shaft, spaced from the nut assembly in the axial direction, and configured to support the hub and screw shaft within the actuator housing; and
   a secondary bearing configured to stabilize a distal end of the rotor, wherein the secondary bearing is configured to float or travel in the axial direction to accommodate thermal expansion of the rotor at the distal end;
   wherein the nut assembly is configured to convert rotational motion of the rotor about the longitudinal axis to linear motion of the thrust tube along the longitudinal axis, and
   wherein the nut assembly extends continuously from a first end opposite the thrust tube to a second end abutting the proximal end of the thrust tube in the axial direction, with the nut adjacent and external thereto, and further comprising a mechanical coupling defined on the second end, in direct physical engagement with the proximal end of the thrust tube.

2. The linear actuator system of claim 1, wherein the nut assembly is directly engaged with the proximal end of the thrust tube and adapted for driving the distal end of the thrust tube between a first retracted position proximate the actuator housing to a second extended position spaced from the actuator housing, absent additional housing or bearing structure intervening between the nut assembly and the proximal end of the thrust tube.

3. The linear actuator system of claim 1, wherein the mechanical coupling comprises a threaded coupling, press fit or interference fitting on the second end of the nut assembly and adapted to engage the proximal end of the thrust tube within a common outer diameter of the thrust tube and nut assembly.

4. The linear actuator system of claim 1, wherein the nut assembly comprises a roller nut engaged about a threaded portion of the screw shaft and extending continuously from the first end of the nut assembly opposite the thrust tube to the second end of the nut assembly abutting the thrust tube, and further comprising the mechanical coupling on the roller nut at the second end of the nut assembly, in the direct physical engagement with the proximal end of the thrust tube.

5. The linear actuator system of claim 1, further comprising a cooling loop at least partially embedded or seated within the actuator housing, with a thermally conductive material disposed at least partially about the cooling loop to conduct heat from the actuator housing.

6. The linear actuator system of claim 5, wherein the cooling loop comprises a conduit for fluid flow and further comprising a recessed feature defined along a selected side of the actuator housing to accept the conduit and thermally conductive material.

7. The linear actuator system of claim 1, further comprising a cooling channel formed or machined into a major body portion of the actuator housing, wherein a cooling loop extends along the cooling channel from a first end in a proximal portion of the actuator housing toward a distal portion of the actuator housing and back to a second end in the proximal portion, adjacent the first end.

8. The linear actuator system of claim 1, wherein the stator is coupled to an inner surface of the actuator housing and the rotor is disposed about the screw shaft and nut assembly, with the thrust tube disposed radially inward of an annular region defined between an outer diameter of the nut assembly and an inner surface of the rotor.

9. The linear actuator system of claim 1, further comprising an adapter rotationally coupled with a threaded portion of the screw shaft and extending along the longitudinal axis to an operable coupling with a controller at a proximal end of the actuator housing, opposite the thrust tube, wherein the controller comprises a resolver or encoder configured to determine a rotational position of the screw shaft via the operative coupling with the adapter.

10. The linear actuator system of claim 9, further comprising a braking assembly disposed about the adapter between the threaded portion of the screw shaft and controller, wherein the braking assembly is configured to brake rotation of the screw shaft responsive to feedback from the resolver or encoder.

11. The linear actuator system of claim 1, further comprising a bushing or bearing disposed about the thrust tube proximate the distal end, wherein the bushing or bearing is keyed a flat or perimeter contour feature adapted to prevent rotation of the thrust tube in linear motion along the longitudinal axis.

12. A method comprising:
operating a motor having a stator and a rotor disposed about a screw shaft, wherein the rotor rotates about a longitudinal axis;
driving a thrust tube along the longitudinal axis, wherein the thrust tube is directly coupled to a nut assembly comprising a nut in threaded engagement with the screw shaft, and wherein the nut assembly extends continuously about the screw shaft from a first end opposite the thrust tube to a second end abutting the thrust tube in an axial direction, absent additional housing or bearing structures intervening therebetween, with the nut adjacent the thrust tube and external thereto; and
loading the thrust tube, wherein the thrust tube extends from a proximal end in direct physical engagement with the second end of the nut assembly to a distal end subject to the loading, opposite the proximal end; and
providing rotational stability to the thrust tube, wherein the thrust tube is supported with a bushing or bearing proximate the distal end;
supporting a proximal end of the screw shaft via a thrust bearing and hub positioned radially outward of the screw shaft at the proximal end thereof, spaced from the first end of the nut assembly in the axial direction; and stabilizing a distal end of the rotor via a secondary bearing configured to float or travel in the axial direction to accommodate thermal expansion of the rotor at the distal end.

13. The method of claim 12, wherein the direct physical engagement comprises a threaded coupling, press fit or interference fitting defined on the second end of the nut assembly, engaging a complementary fitting on the proximal end of the thrust tube.

14. The method of claim 12, wherein loading the thrust tube comprises a threaded coupling, press fit or interference fitting on the second end of the nut assembly receiving the complementary fitting on the proximal end of the thrust tube within an outer diameter of the nut assembly.

15. The method of claim 12, wherein providing rotational stability comprises the bushing or bearing being keyed to prevent rotation of the thrust tube when driven along the longitudinal axis, wherein the thrust tube comprises at least one flat or perimeter contour feature adapted to prevent the rotation when engaged with a complementary flat or perimeter contour feature in the bushing or bearing.

16. The method of claim 12, further comprising dissipating heat with a cooling loop at least partially embedded or seated within a housing extending about the stator and rotor disposed about the screw shaft, with a thermally conductive material at least partially disposed about the cooling loop conducting the heat from the housing to the cooling loop.

17. The method of claim 12, further comprising determining a rotational position of the screw shaft with a controller comprising a resolver or encoder, wherein the resolver or encoder is operably coupled with an adapter extending along the longitudinal axis from an operational coupling with the resolver or encoder to a rotational coupling with a threaded portion of the screw shaft.

18. The method of claim 17, further comprising braking rotation of the screw shaft with a braking assembly arranged about the adapter, responsive to feedback from the controller.

19. An apparatus comprising:
a stator coupled to an actuator housing;
a rotor disposed within the actuator housing, proximate the stator;
a screw shaft disposed within the rotor, extending along an axis of the actuator housing;
a nut assembly comprising a nut engaged about a threaded portion of the screw shaft; and
a thrust tube coupled with the nut assembly, the thrust tube extending continuously along the axis from a proximal end to a distal end;
a mechanical fitting that defines a direct physical engagement between the proximal end of the thrust tube and the nut assembly, wherein the mechanical fitting is configured to engage a complementary fitting on the proximal end of the thrust tube within an outer diameter of the nut assembly, absent additional load bearing components intervening therebetween, with the nut adjacent the proximal end of the thrust tube along the axis and external thereto;
a hub rotationally coupled to a proximal end of the screw shaft and a proximal end of the rotor, adjacent the nut assembly;
a thrust bearing positioned radially outward of the hub at the proximal end of the screw shaft, spaced from the nut assembly along the axis, and configured to support the hub and screw shaft within the actuator housing; and a secondary bearing configured to stabilize a distal end of the rotor, wherein the secondary bearing is configured to float or travel in along the axis to accommodate thermal expansion of the rotor at the distal end.

20. The apparatus of claim 19, wherein the mechanical fitting comprises a threaded coupling, press fit or interference fitting configured to accept the complementary fitting on the proximal end of the thrust tube within the outer diameter of the nut assembly, absent additional housing or bearing structure intervening in an annular region defined between the outer diameter of the nut assembly and an inner surface of the rotor.

21. The apparatus of claim 19, further comprising a cooling loop at least partially embedded or seated within a recessed feature defined in a major body portion of the actuator housing, with a thermally conductive material disposed at least partially about the cooling loop to conduct heat from the actuator housing.

22. The apparatus of claim 19, further comprising an adapter rotationally coupled to the threaded portion of the screw shaft and extending along the axis to an operational coupling with an encoder, wherein the encoder is configured to determine a rotational position of the screw shaft via the operative coupling with the adapter.

23. The apparatus of claim 22, further comprising a braking assembly arranged along the adapter with a feedback device mounted to the braking assembly using a pilot feature, wherein the braking assembly is configured to brake rotation of the screw shaft responsive to operation of the feedback device.

* * * * *

UNITED STATES PATENT AND TRADEMARK OFFICE
CERTIFICATE OF CORRECTION

PATENT NO. : 11,754,157 B2
APPLICATION NO. : 16/878897
DATED : September 12, 2023
INVENTOR(S) : Lucas Keranen, Wyatt Grunerud and Gary Rosengren It is certified that error appears in the above-identified patent and that said Letters Patent is hereby corrected as shown below:

In the Claims

At Column 18, Line 26 (Claim 1):
"housing; and"
Should be:
--housing;--

At Column 18, Line 62 (Claim 4):
"nut at the second end of the nut assembly, in the direct"
Should be:
--nut at the second end of the nut assembly, in direct--

At Column 19, Line 39 (Claim 11):
"keyed a flat or perimeter contour feature adapted to prevent"
Should be:
--keyed to a flat or perimeter contour feature adapted to prevent--

At Column 19, Line 55 (Claim 12):
"thereto; and"
Should be:
--thereto--

At Column 19, Line 59 (Claim 12):
"subject to the loading, opposite the proximal end; and"
Should be:
--subject to the loading, opposite the proximal end;--

At Column 21, Line 3 (Claim 19):
"to float or travel in along the axis to accomodate"

Signed and Sealed this
Nineteenth Day of November, 2024

*Katherine Kelly Vidal*
Katherine Kelly Vidal
*Director of the United States Patent and Trademark Office*

Should be:

--to float or travel along the axis to accommodate--